United States Patent [19]

Lüchinger

[11] 4,433,740
[45] Feb. 28, 1984

[54] WEIGHING APPARATUS INCLUDING A RESILIENTLY CONNECTED SCALE PAN CARRIER

[75] Inventor: Paul Lüchinger, Uster, Switzerland

[73] Assignee: Mettler Instrument AG, Greifensee, Switzerland

[21] Appl. No.: 346,759

[22] Filed: Feb. 8, 1982

[30] Foreign Application Priority Data

Apr. 10, 1981 [CH] Switzerland .................. 2417/81

[51] Int. Cl.³ .................. G01G 21/10; G01G 3/08
[52] U.S. Cl. .................................. 177/187; 177/229
[58] Field of Search ............ 177/154, 156, 187, 189, 177/229

[56] References Cited

U.S. PATENT DOCUMENTS

| | | | |
|---|---|---|---|
| 4,100,985 | 7/1978 | Meier | 177/189 |
| 4,170,270 | 10/1979 | Sette et al. | 177/229 X |
| 4,254,841 | 3/1981 | Loskill | 177/154 X |
| 4,319,650 | 3/1982 | Brendel | 177/156 |

Primary Examiner—George H. Miller, Jr.
Attorney, Agent, or Firm—Laubscher, Philpitt & Laubscher

[57] ABSTRACT

A weighing apparatus is disclosed including a vertically movable load receiving member, and a scale pan carrier resiliently connected with the load receiving member for limited movement with respect thereto, thereby to protect the weighing system against damage upon the occurrence of lateral impact during handling. In the preferred embodiment, a horizontal scale pan carrier arm is connected at one end with the load receiving member for limited movement (a) horizontally axially in a direction normal to the vertical axis of the load receiving member, (b) pivotally upwardly about a horizontal pivot axis, and (c) rotationally in a horizontal plane about the vertical axis of the load receiving member.

8 Claims, 4 Drawing Figures

WEIGHING APPARATUS INCLUDING A RESILIENTLY CONNECTED SCALE PAN CARRIER

BRIEF DESCRIPTION OF THE PRIOR ART

Weighing systems including a load receiving member guided for vertical movement relative to a stationary housing are well known in the patented prior art, as disclosed, for example, by the patents to Allenspach U.S. Pat. No. 3,786,884, Meier U.S. Pat. Nos. 3,788,134, 3,897,681 and 4,100,985, and Lüchinger U.S. Pat. No. 4,043,415, among others.

Conventional scales with freely suspended scale pans offer the advantage that the pan is relatively insensitive. For example, with respect to lateral impacts because of its pendulating suspension, the scale pan simply moved out of the way and there was hardly any reason to fear any damage to the weighing system. This is counterbalanced by a number of disadvantages, for example, a long oscillation delay time. This is why one increasingly switched to scales with guided pans, expecially in combination with electromagnetic load compensation. Such a scale, for example, is disclosed in the aforementioned Meier U.S. Pat. No. 4,100,985, which scale contains several design features in terms of the arrangement of masses for producing weighing measurements that are substantially independent of disturbing vibrations. With respect to mechanical impacts, that scale however is sensitive in several directions.

SUMMARY OF THE INVENTION

It is the purpose of this invention to provide a scale with a guided pan, expecially an analytical scale, with improved resilient mounting means, in particular to make is less sensitive to lateral impacts, such as those that frequently occur during the loading and unloading of the scale pan.

According to the invention, a laterally elastically yielding suspension of the scale pan carrier is proposed to solve this problem.

In one preferred version, the scale is provided with a horizontal outrigger arm used as scale pan carrier here. The laterally yielding suspension practicably here includes two essentially horizontally arranged coil springs which bias the outrigger arm toward its normal position.

To improve the reproducibility of weighing results, the arrangement is practicably so made that the scale pan carrier is supported with little friction on a ball bearing.

According to a primary object of the invention, a horizontal scale pan carrier arm is connected at one end with the vertical load receiving member by pin and slot means that afford limited movement of the carrier arm—against the restoring force of spring biasing means—relative to the load receiving member (a) horizontally axially in a direction normal to the vertical axis of the load receiving member, (b) pivotally upwardly about a horizontal pivot axis, and (c) rotationally in a horizontal plane about the vertical axis of the load receiving member, thereby to protect the weighting apparatus against damage when subjected to lateral impact forces.

BRIEF DESCRIPTION OF THE DRAWINGS

Other objects and advantages of the invention will become apparent from a study of the following specification when viewed in the light of the accompanying drawings, in which.

DETAILED DESCRIPTION

Figure 1:
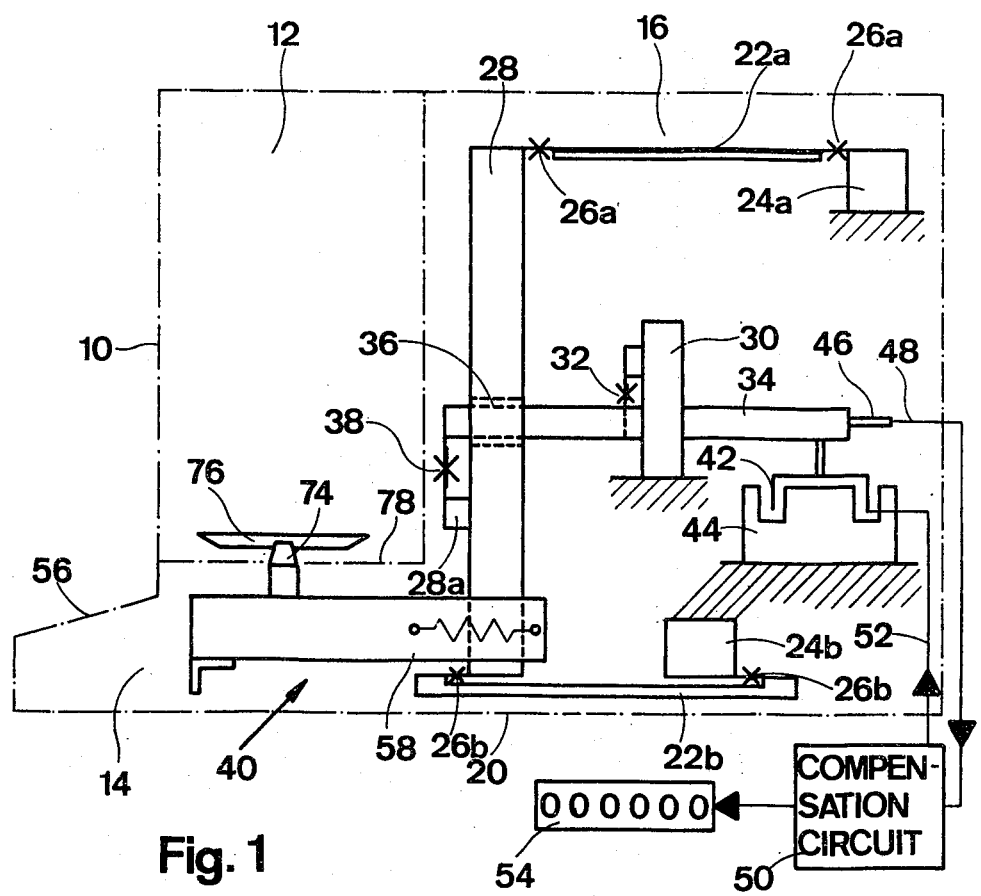
FIG. 1 is a diagrammatic representation of the weighing apparatus of the present invention.

The weighing apparatus includes a housing 10 illustrated in phantom containing a weighing chamber 12, a lower chamber 14 below the weighing chamber, and a rear chamber 16 that contains the components of the weighing system. The entire assembly is mounted on a base plate 20.

A main load receiving member 28 is mounted for vertically guided movement relative to the housing 10 by means of upper and lower triangular-shaped horizontally-arranged guide plates 22a, 22b that are connected at opposite ends with fixed housing bearing block portions 24a and 24b and with the load receiver 28 by resilient flexure bearing members 26a and 26b, respectively. Mounted on the lower end of the load receiver member 28 are the scale pan carrier means 40, as will be described in greater detail below.

Connected intermediate its ends with the housing fixed support portion 30 by flexure suspension bearing 32 is a lever 34. At one end, the lever extends through an opening 36 contained in load receiving member 28 for connection with an extension 28a thereof via flexure suspension bearing 38. At its other end, the lever carries an annular electromagnetic compensation coil 42 arranged for movement relative to a magnetic field produced by a stationary permanent magnet 44 mounted on the housing. Optical sensing means 46 is mounted for sensing displacement of the lever 34 from an initial on-load or null position relative to the housing, and for sending a corresponding signal to the compensation regulating circuit 50 via conductor 48.

The operation of weighing apparatus of the return-to-zero electromagnetic compensation type is well known in the prior art, as evidenced, for example, by the aforementioned Allenspach U.S. Pat. No. 3,786,884. Thus, if lever 34 were to be pivotally displaced from its initial no-load position by the application of a load to scale pan 76, a signal is supplied from optical sensor means 46 to the compensation regulating circuit 50 via conductor 48, whereupon compensating current is supplied via conductor 52 to the coil 42, arranged in the stationary magnetic field of a permanent magnet 44, thus generating a force to displace the lever 34 and the load receiver member 28 toward their initial no-load positions. The amount of compensating current required to return the lever to the no-load position is a function of the load applied to the pan, as visually indicated by the digital display 54, which is customarily mounted adjacent the front portion 56 of the housing.

Figure 4:
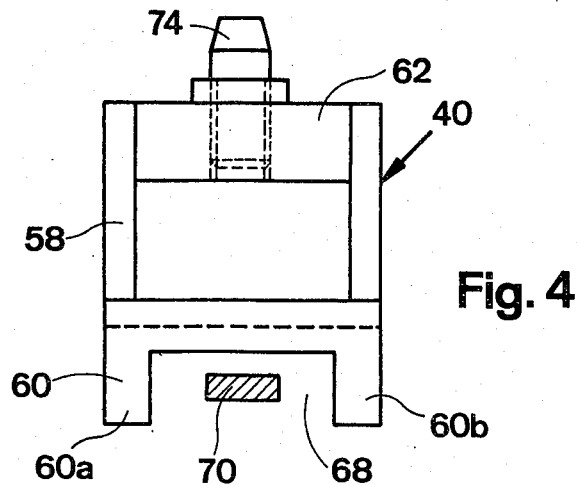
FIGS. 3 and 4 are sectional views taken along lines 3—3 and 4—4, of FIGS. 2 and 3, respectively.
Figure 2:
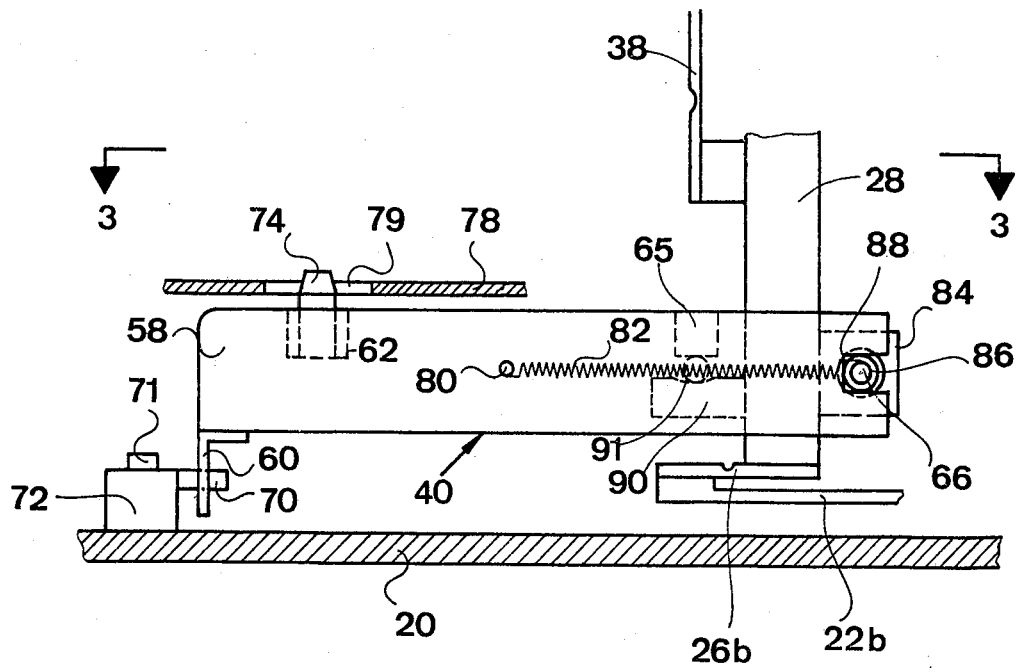
FIG. 2 is a detailed sectional view of the scale pan carrier arm of FIG. 1.
Figure 3:
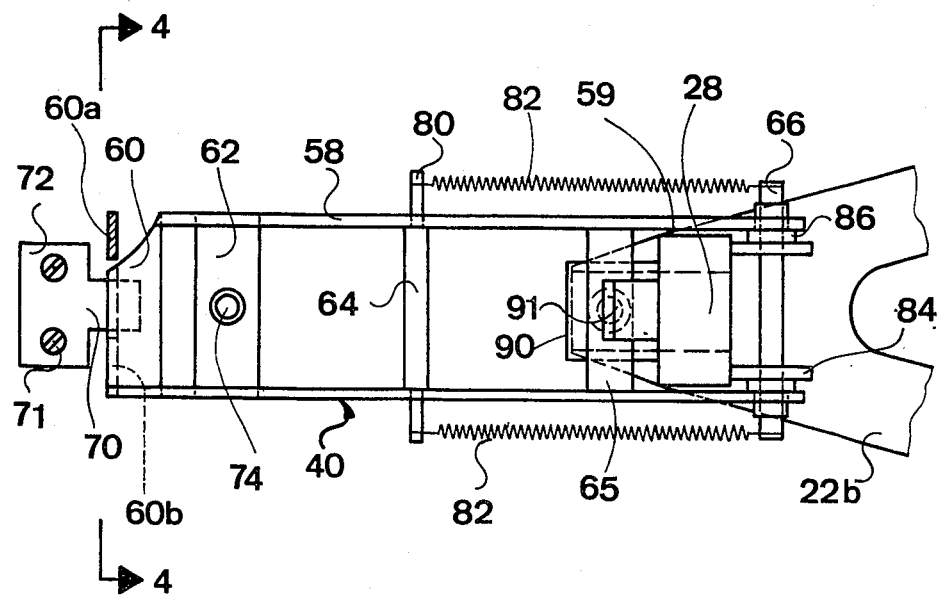

In accordance with a characterizing feature of the present invention illustrated more particularly in FIGS. 2-4, the scale pan carrier means 40 is resiliently connected for limited movement in a direction normal to the axis of the main load receiving member 28. The carrier means includes a horizontal carrier arm defined by a pair of parallel spaced vertical sheet metal side plates 58 that are connected by a pair of transverse struts 62, 65, which side plates extend on opposite sides of the load receiver element, as shown in FIG. 3. Also connected between the side plates at one end of the arm is a sheet metal angle guide member 60, and intermediate the ends of the arm is connected a spacer pin 64 having end extremities 80 that protrude through corresponding openings contained in the side plates 58. The angle guide 60 includes a downwardly depending portion that contains a slot or recess 68 (FIG. 4) that receives the nose portion 70 of a stop 72 that is connected with the housing by bolts 71. Threadably connected with the transverse strut 62 is a conical pin 74 that receives the scale pan 76. The bottom wall 78 of the weighing chamber 12 that contains the scale pan 76 contains an opening 79 (FIG. 2) through which the pin 74 extends. Thus, the bottom wall 78 of the housing chamber 12 extends between the scale pan and the carrier arm, thereby to isolate the weighing chamber from the remainder of the housing interior.

Connected at their ends with the end extremities 80 of the spacer pin 64 are a pair of helical tension springs 82. At their other ends, the springs are connected with the end extremities of a horizontal pin 66 that is supported by a pair of extrusions 84 on the load receiver member 28. Rotatably mounted adjacent each end of the pin 66 is a cylindrical bushing 86 formed of a synthetic plastic low-friction material (such as a polyamide). These bushings are slidably mounted in horizontal slots 88 contained in the end extremities of the side plates 58.

The load receiver 28 also includes a horizontal extension 90 that extends in spaced relation beneath the transverse strut 65, low-friction ball bearing means 91 being mounted between the extension 90 and the strut 65. Thus, the carrier arm 40 is supported by the plastic bushings 86 and by the ball bearing 91 for limited horizontal displacement normal to the vertical axis of the load receiver 28, the carrier arm normally being biased to the right to the initial position illustrated in FIG. 2.

Thus, in accordance with the novel pan carrier suspension system of the present invention, a certain degree of mobility of the scale pan carrier 40 in both the horizontal and vertical directions is permitted. Vertical mobility is provided by the parallel guide plates 22a, 22b which afford the vertical movement of the load receiver 28 and the scale carrier 40 connected thereto. In accordance with an important feature of the invention, if the load receiver 28 should be vertically displaced downwardly beyond its intended lower limit of travel, the angle guide 60 will engage the stationary stop 70, thereby causing carrier arm 40 to pivot slightly upwardly in the clockwise direction about pin 66 against the restoring force of its weight. During this safety release pivotal movement of the carrier arm the strut portion 65 is lifted from the roller bearing 91. Any upward pivotal movement of the carrier arm is limited by the engagement of the left hand end of the carrier arm with the lower surface of the weighing chamber bottom wall 78.

A certain degree of horizontal movement of the carrier arm 40 in a direction away from the load receiver member (i.e., to the left in FIGS. 1-3) against the restoring bias of springs 82 is permitted, the stop means 72 being engageable by the depending leg portions 60a, 60b of the angle guide 60 to limit the extent to which the carrier arm is displaceable away from the load receiver member 28.

Above all, however, the scale pan carrier 40 is resiliently mounted for protection against lateral impacts which occur most frequently during handling in the weighing chamber (i.e., an impact that normally comes in a lateral direction from the sides). Thus, the mounting means is yieldable—against the restoring force of the springs 82 on a circular arc about the vertical axis of the load receiver 28, as limited by the cooperation of one of the spaced angle guide legs 60a, 60b with the stationary stop projection 70—without damage to the weighing system, whereby guidance is accomplished by the synthetic plastic bushings 86 with the horizontal slots 88.

While the invention has been described in connection with weighing apparatus of the electromagnetic load compensation return-to-zero type, it is apparent that the inventive concepts are applicable to other types of weighing apparatus as well. Other changes and modifications may be made without deviating from the inventive concepts set forth above.

What is claimed is:

1. In a weighing apparatus of the type including a housing (10), a load receiving member (28), and means (22a, 22b) connecting said load receiving member for vertical movement relative to said housing;
   the improvement which comprises
   scale pan carrier means (40) for supporting a scale pan (76);
   means (86, 88) connecting said pan carrier means with said load receiving member for limited horizontal movement between first and second positions relative to said load receiving member; and
   resilient means (82) biasing said pan carrier means toward said first position.

2. Apparatus as defined in claim 1, wherein said scale pan carrier means comprises a horizontal carrier arm movably connected at one end with said load receiving member, said scale pan being mounted on the other end of said carrier arm.

3. Apparatus as defined in claim 2, wherein said resilient means comprises a pair of horizontal tension springs (82) arranged on opposite sides of said carrier arm, each of said springs being connected at one end with said carrier arm and at the other end with said load receiving member.

4. Apparatus as defined in claim 2, and further including roller bearing means (91) supporting said scale pan carrier arm for horizontal movement relative to said load receiving member.

5. In a weighing apparatus of the type including a housing (10), a load receiving member (28), and means (22a, 22b) connecting said load receiving member for vertical movement relative to said housing:
   the improvement which comprises
   (a) horizontal scale pan carrier means (40) for supporting at one end a scale pan (76);
   (b) means (86, 88) connecting said scale pan carrier means at its other end with said load receiving member for limited horizontal movement between first and second positions relative to said load receiving member, said connecting means including roller bearing means (91) supporting said scale pan carrier means for horizontal movement relative to said load receiving member; and
   (c) resilient means (82) biasing said pan carrier means toward said first position, said resilient means including a pair of horizontal tension springs (82) arranged on opposite sides of said carrier arm means, each of said springs being connected at one end with said carrier arm and at the other end with said load receiving member;

(d) said horizontal scale pan carrier means including a pair of parallel vertical side plates (58) arranged on opposite sides of said load receiving member, said load receiving member including a horizontal extension (84) that extends in space parallel relation between said side plates in a direction away from the scale pan end of the carrier arm, and a horizontal pin (66) mounted on said extension, aid pin extending normal to the axis of said carrier arm outwardly at each end through horizontal opposed slots (88) contained in said side plates, respectively, said springs being connected at their said other ends with the end extremities of said pin, respectively, whereby the carrier arm is supported for limited rotational movement about the vertical axis of said load receiver member, for limited vertical pivotal movement about said horizontal pin, and for limited horizontal axial movement relative to said load receiver member, respectively.

6. Apparatus as defined in claim 5, and further including stop means (70) for limiting the extent of displacement of said pan carrier arm relative to said load receiving member.

7. Apparatus as defined in claim 6, wherein said stop means is connected with the housing for limiting the extent of linear horizontal displacement of said scale pan carrier means in the direction away from said load receiver member.

8. Apparatus as defined in claim 6, wherein said stop means includes a horizontal stop projection (70), said carrier arm including pair of laterally spaced downwardly projecting arm portions (60a, 60b) arranged on opposite sides of said stop projection, whereby said stop projection and said arm portions cooperate to limit the extent of rotational movement of said carrier arm relative to load receiving member.

* * * * *